United States Patent
Azzolini et al.

(10) Patent No.: US 11,658,483 B2
(45) Date of Patent: May 23, 2023

(54) MAXIMUM POWER POINT TRACKING THROUGH LOAD MANAGEMENT

(71) Applicants: Joseph Azzolini, Tempe, AZ (US); Meng Tao, Fountain Hills, AZ (US)

(72) Inventors: Joseph Azzolini, Tempe, AZ (US); Meng Tao, Fountain Hills, AZ (US)

(73) Assignee: ARIZONA BOARD OF REGENTS ON BEHALF OF ARIZONA STATE UNIVERSITY, Scottsdale, AZ (US)

(*) Notice: Subject to any disclaimer, the term of this patent is extended or adjusted under 35 U.S.C. 154(b) by 0 days.

(21) Appl. No.: 17/552,782

(22) Filed: Dec. 16, 2021

(65) Prior Publication Data
US 2022/0190598 A1 Jun. 16, 2022

Related U.S. Application Data

(60) Provisional application No. 63/126,053, filed on Dec. 16, 2020.

(51) Int. Cl.
*H02J 3/00* (2006.01)
*H02J 3/28* (2006.01)
*H02J 3/38* (2006.01)

(52) U.S. Cl.
CPC ............ *H02J 3/007* (2020.01); *H02J 3/28* (2013.01); *H02J 3/381* (2013.01); *H02J 2300/26* (2020.01)

(58) Field of Classification Search
CPC ...... H02J 3/007; H02J 3/00; H02J 3/28; H02J 3/381; H02J 3/38; H02J 2300/26
See application file for complete search history.

(56) References Cited

U.S. PATENT DOCUMENTS

| | | |
|---|---|---|
| 4,511,807 A | 4/1985 | Somervilie |
| 4,571,532 A | 2/1986 | Jaster |
| 5,635,816 A | 6/1997 | Welsh et al. |
| 6,037,758 A | 3/2000 | Perez |
| 6,624,350 B2 | 9/2003 | Nixon |
| 6,889,122 B2 | 5/2005 | Perez |
| 10,399,441 B2 | 9/2019 | Tao |
| 10,840,735 B1 * | 11/2020 | Cooper ............. H02J 13/00004 |

(Continued)

OTHER PUBLICATIONS

J. A. Azzolini and M. Tao, "A Control Strategy for Improved Efficiency in Direct-Coupled Photovoltaic Systems through Load Management" Applied Energy, vol. 231, p. 926 (2018).

(Continued)

*Primary Examiner* — Robert L Deberadinis
(74) *Attorney, Agent, or Firm* — Snell & Wilmer L.L.P.

(57) ABSTRACT

A load management system for a solar photovoltaic (PV) system is disclosed. The load management system may include a PV array of solar modules, a plurality of loads configured to be powered by the PV array and switched on or off by a plurality of respective relays, a power sensor configured to measure an amount of power delivered from the PV array to the plurality of loads, and a controller coupled to the power sensor and the plurality of relays. The controller may be configured to determine a first power output of the PV array at a first time, switch a load, determine a second power output of the PV array at a second time, compare the first power output and the second power output, and based on the comparison, maintain the switched load or undo the switching of the load.

20 Claims, 13 Drawing Sheets

(56) References Cited

U.S. PATENT DOCUMENTS

| | | | |
|---|---|---|---|
| 2010/0017045 A1 | 1/2010 | Nesler | |
| 2010/0207448 A1 | 8/2010 | Cooper et al. | |
| 2010/0264732 A1 | 10/2010 | Beck | |
| 2014/0265573 A1 | 9/2014 | Kreutzman | |
| 2016/0376712 A1 | 12/2016 | Ono | |

OTHER PUBLICATIONS

Tan, Kelvin, et al. "Algorithms for Maximum Power Point Tracking through Load Management".

J. A. Azzolini, "Development of a load-managing photovoltaic system topology," Ph.D. dissertation, Arizona State University (2020).

J. A. Azzolini and M. Tao, "Maximum power point tracking through load management," U.S. Appl. No. 63/126,053 (2020).

N. Blair et al., "System Advisor Model (SAM) general description (Version 2017.9.5)," National Renewable Energy Laboratory (2018).

J. A. Azzolini and M. Tao, "A Load-Managing Photovoltaic System for Electric Vehicle Charging", Arizona State University.

E. Roston, Electric cars can help clean up the grid—Electricity needs to come from renewable sources in order to arrest climate change, http://www.bloomberg.com/news/articles/2016-04-29/elecliic-cars-canhelp-clean-up-the-grid.

International Energy Agency, Global EV Outlook 2016—Beyond One Million Electric Cars (2016).

US Energy Information Administration, What is U.S. electricity generation by energy source?, EIA. https://www.eia.gov/tools/faqs/faq.cfm?id=427&t=3.

D. Chung, C. Davidson, R. Fu, K. Ardani, and R. Margolis, "U.S. Photovoltaic Prices and Cost Breakdowns: Q1 2015 Benchmarks for Residential, Commercial, and Utility-Scale Systems," National Renewable Energy Laboratory. (2015) http://www.nrel.gov/docs/fy15osti/64746.pdf.

USPTO; Notice of Allowance dated May 2, 2019 in U.S. Appl. No. 15/350,171.

USPTO; Non-Final Office Action dated Jun. 15, 2018 in U.S. Appl. No. 15/350,171.

USPTO; Final Office Action dated Feb. 7, 2019 in U.S. Appl. No. 15/350,171.

Hansen, A. D., Sørensen, P. E., Hansen, L. H., & Bindner, H. W. (2001). "Models for a stand-alone PV system." Denmark. Forskningscenter Risoe. Risoe-R No. 1219(EN).

Nishad Mend Is, Kash Em Muttaqi, Saad Sayeef, Sara Th Perera, "Autonomous Operation of Wind-Battery Hybrid Power System with Maximum Power Extraction Capability," 2010, pp. 1-7, 2010 international Conference on Power System Technology (POWERCON).

Robert S. Balog, "Autonomous Local Control in Distributed DC Power Systems," Dissertation, 2006, Department of Electrical and Computer Engineering, University of Illinois at Urbana-Champaign.

Nahidul Hoque Samrat, Norhafizan Ahmad, Imtiaz Ahmed Choudhury, Zahar Taha, "Technical Study of a Standalone Photovoltaic-Wind Energy Based Hybrid Power Supply Systems for Island Electrification in Malaysia," Plos One, Jun. 29, 2015, 10(6): e0130678.

J. Faxas-Guzman, R. Garcia-Valverde, L. Serrano-Lujan, A. URBiNA, "Priority load control algorithm for optimal energy management in stand-alone photovoltaic systems, Renewable Energy," Jan. 26, 2014, vol. 68, pp. 156-162, 0960-1481, Elsevier Ltd. 2014.

\* cited by examiner

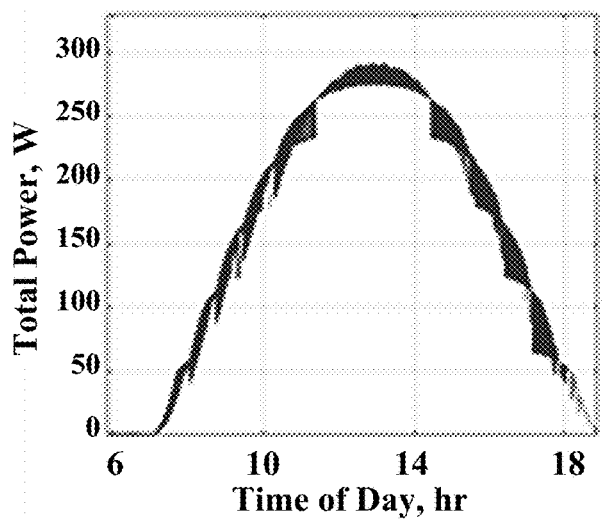 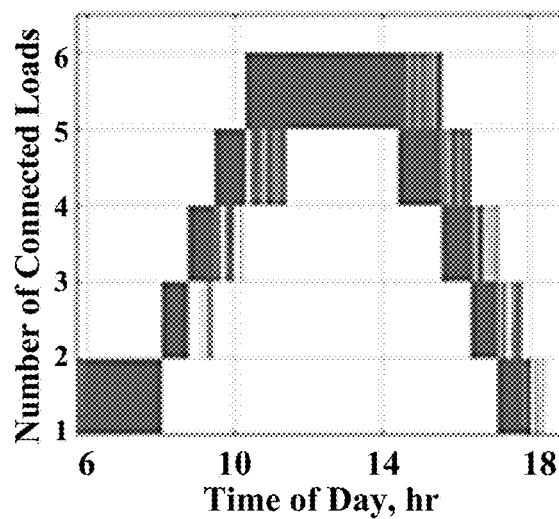
FIG. 5A  FIG. 5B
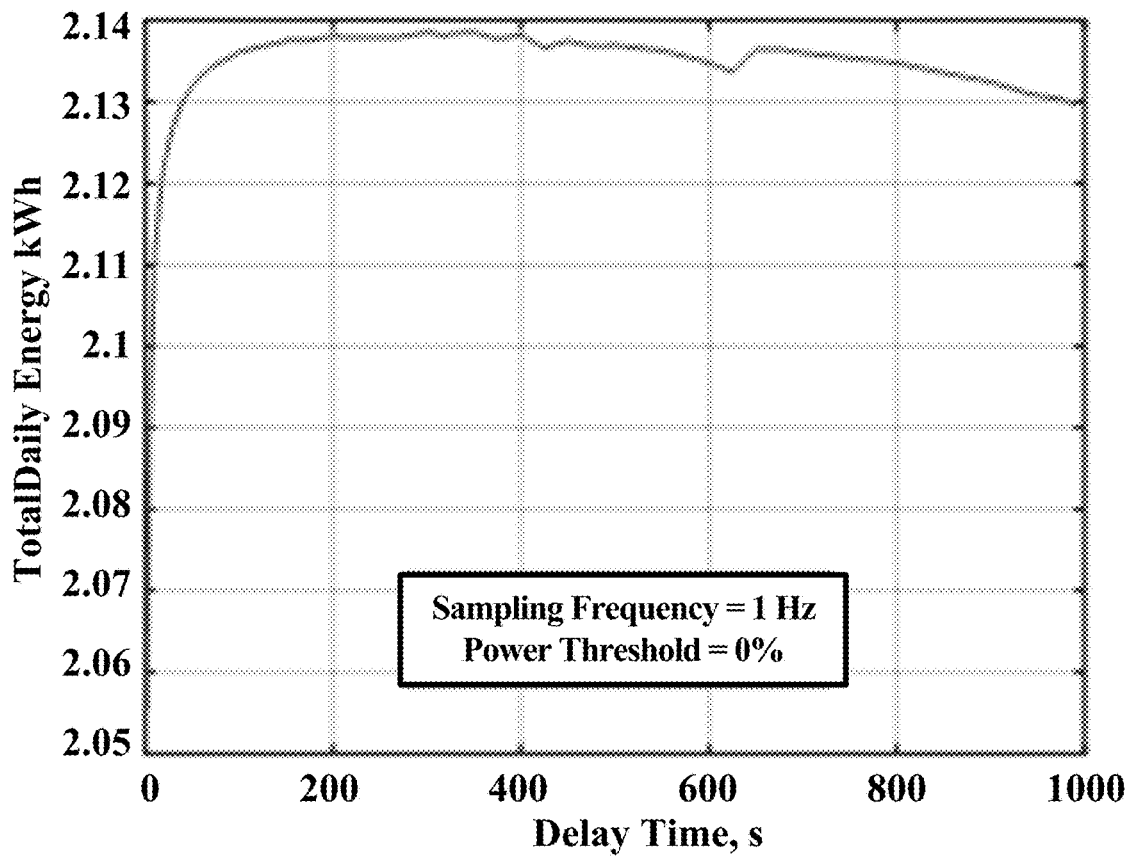
FIG. 6

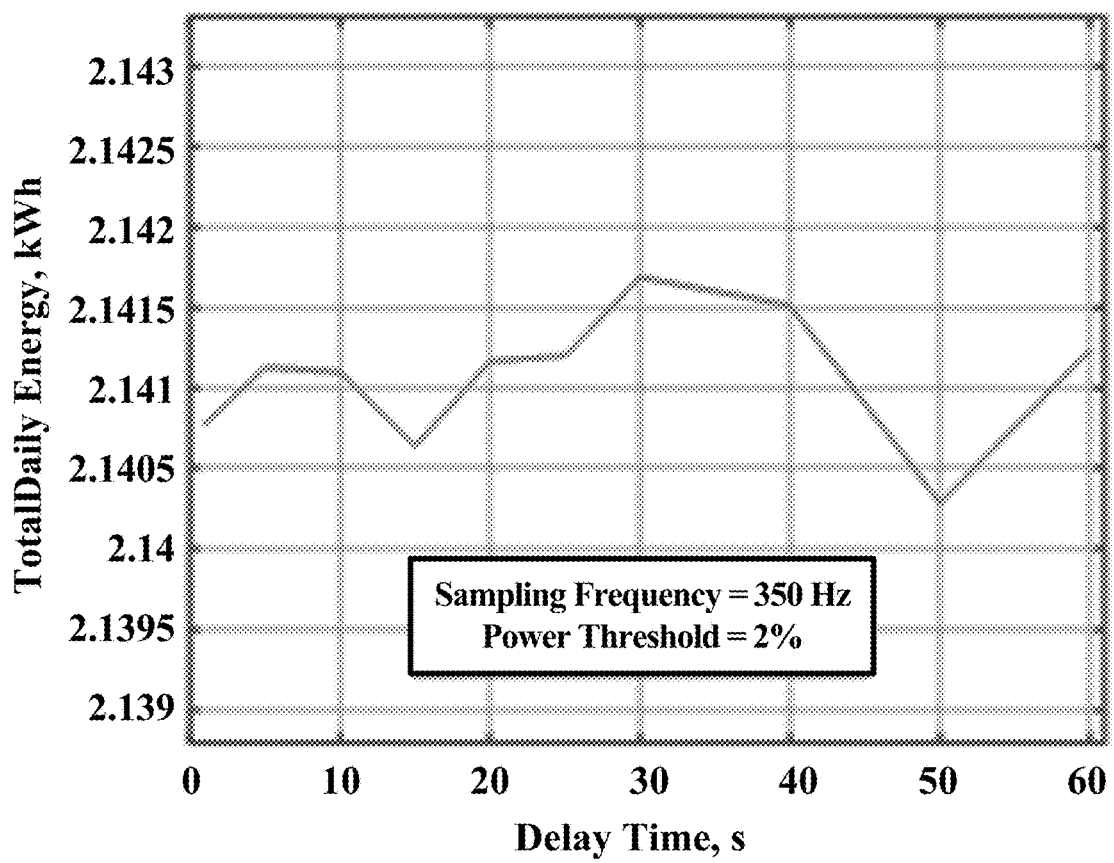
FIG. 9
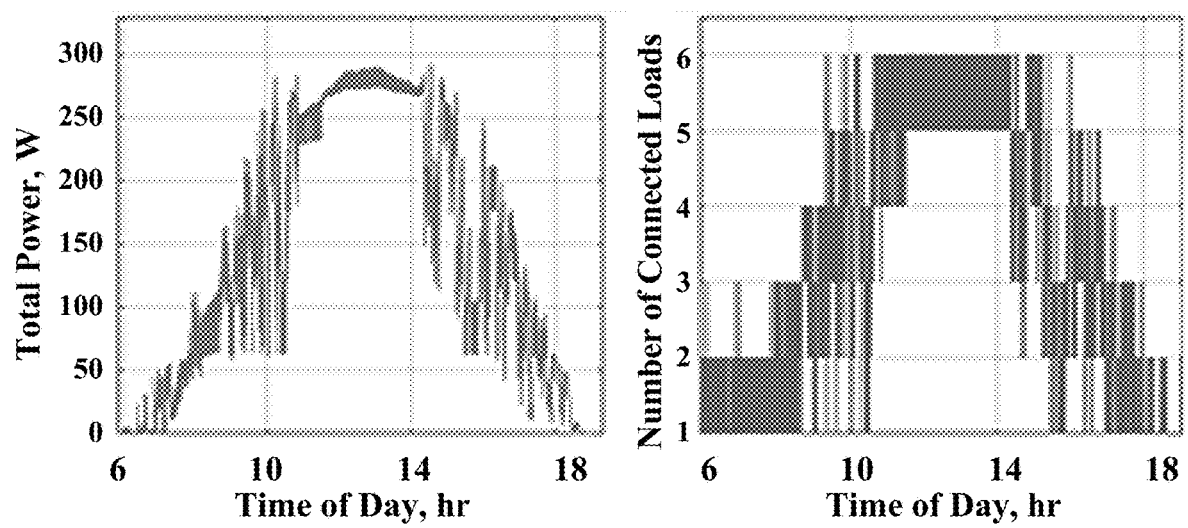
FIG. 10A
FIG. 10B

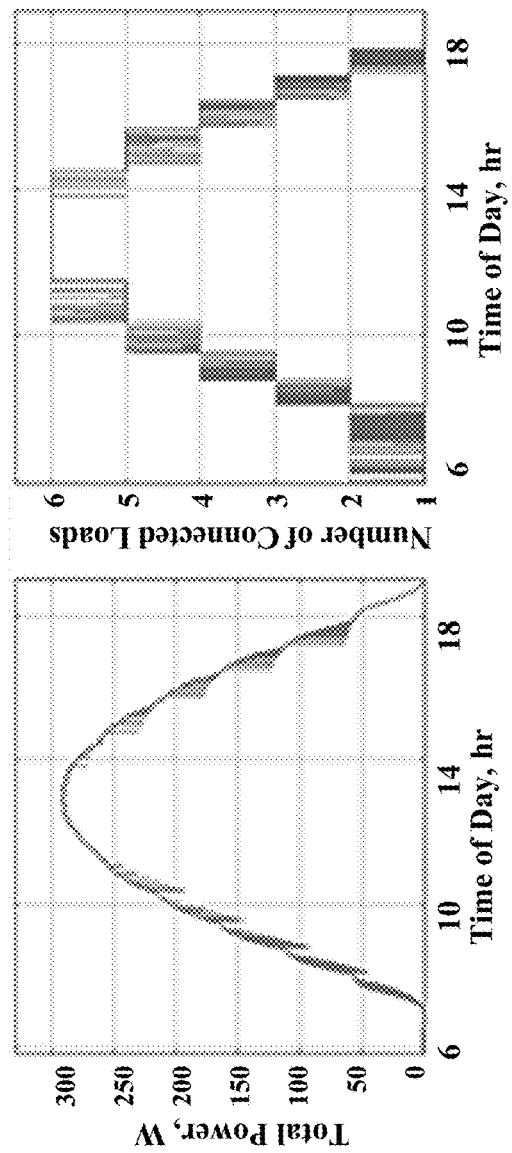
FIG. 17A
FIG. 17B
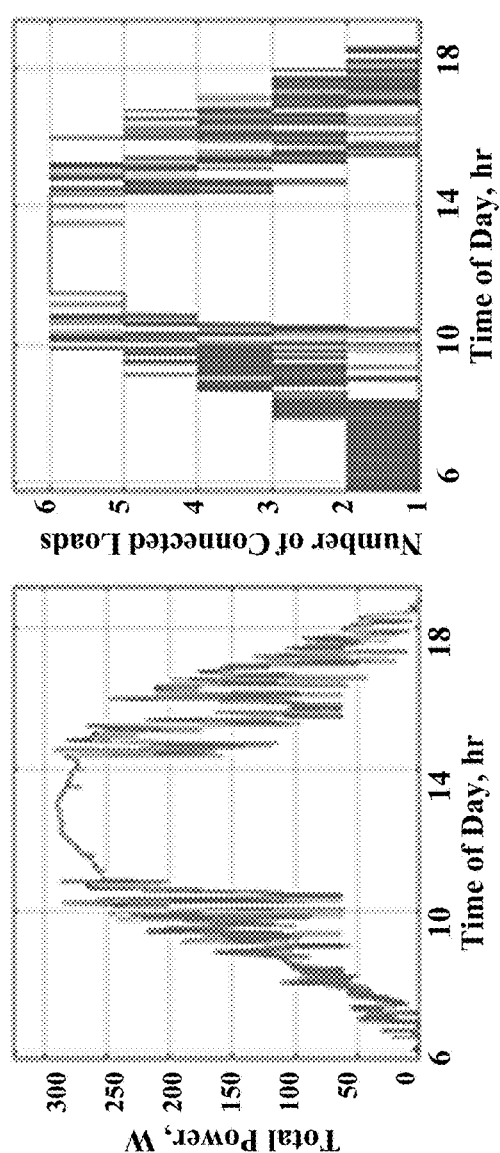
FIG. 18A
FIG. 18B

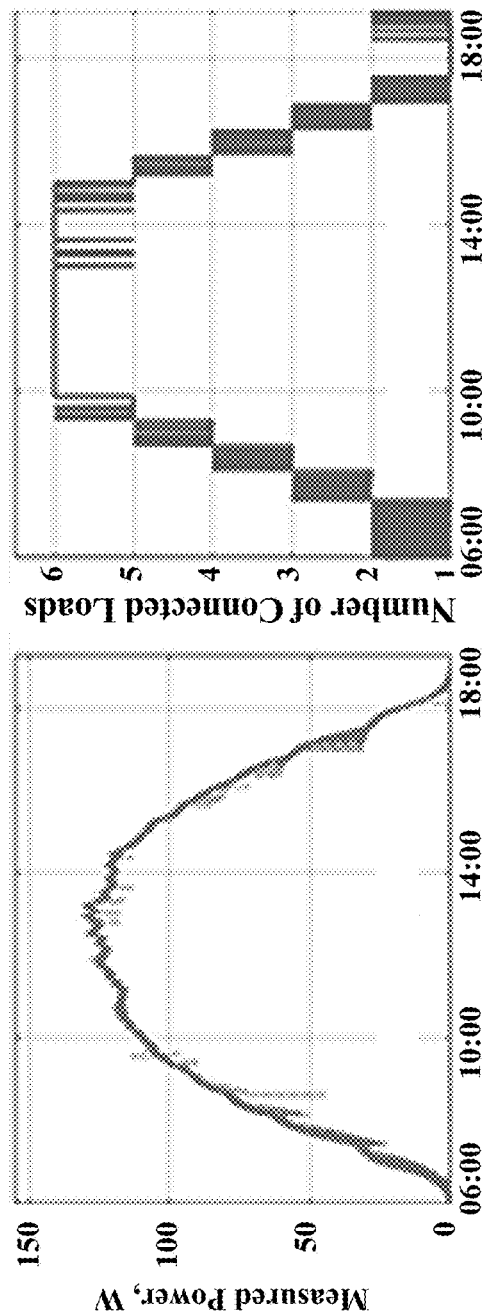
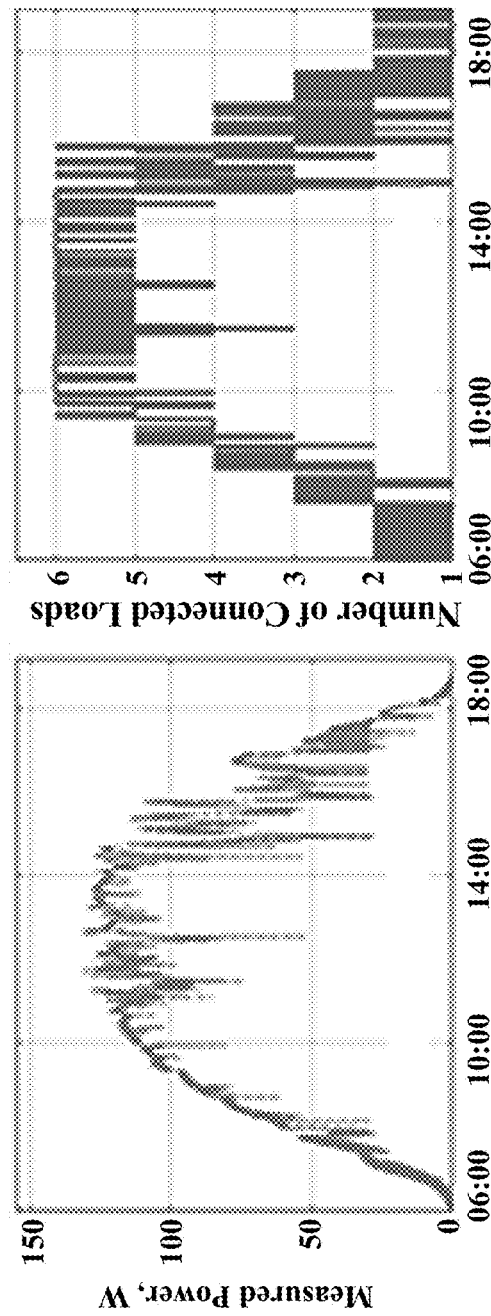
FIG. 19A
FIG. 19B
FIG. 20A
FIG. 20B

MAXIMUM POWER POINT TRACKING THROUGH LOAD MANAGEMENT

CROSS-REFERENCE TO RELATED APPLICATIONS

This application is a non-provisional of, and claims priority to and the benefit of U.S. Provisional Application No. 63/126,053, entitled "MAXIMUM POWER POINT TRACKING THROUGH LOAD MANAGEMENT," filed on Dec. 16, 2020. The disclosure of the foregoing application is incorporated herein by reference in its entirety, including but not limited to those portions that specifically appear hereinafter, but except for any subject matter disclaimers or disavowals, and except to the extent that the incorporated material is inconsistent with the express disclosure herein, in which case the language in this disclosure shall control.

TECHNICAL FIELD

The present disclosure relates to renewable energy systems such as solar power systems, and in particular to intelligent control of loads driven by, e.g., solar power.

BACKGROUND

Renewable energy systems, for example solar power systems, often generate power intermittently, for example based on varying cloud coverage and other conditions. This inherent variability can lead to significant inefficiencies in utilizing these renewable energy sources. Accordingly, improved systems and approaches for managing and utilizing renewable energy, for example, solar power, wind power, wave power, and/or the like, remain desirable.

SUMMARY

In various embodiments, a load management system for a solar photovoltaic (PV) system is disclosed. The system may include: a PV array of solar modules; a plurality of loads configured to be powered by the PV array and switched on or off by a plurality of respective relays; a power sensor configured to measure an amount of power delivered from the PV array to the plurality of loads; and a controller coupled to the power sensor and the plurality of relays and configured to: determine, by the power sensor, a first power output of the PV array at a first time; cause, via a relay, a switch of a load; determine, by the power sensor, a second power output of the PV array at a second time which is later than the first time after the switching of the load; compare the first power output and the second power output; and based on the comparison: if the second power output is greater than the first power output, maintain the switched load in its switched connection; and if the second power output is not greater than the first power output, cause, by the relay, undoing of the switch of the load; wherein a power output of the PV array is not configured to be routed through the controller for conditioning or managing prior to being delivered to any of the plurality of loads, and wherein the solar PV system does not include power conditioning electronics for the power output of the PV array.

In various embodiments, a method for managing a solar photovoltaic (PV) system is disclosed. The method may include: determining, by a power sensor, a first power output of a PV array of the solar PV system at a first time; causing, by a relay, switching of a load of a plurality of loads; determining, by the power sensor, a second power output of the PV array at a second time which is later than the first time after the switching of the load; comparing the first power output and the second power output; and based on the second power output being greater than the first power output, maintaining the switched load in its switched connection, or based on the second power output not being greater than the first power output, causing, by the relay, undoing of the switching of the load.

In various embodiments, a controller apparatus for managing a solar photovoltaic (PV) system is disclosed. The controller apparatus may include a processor configured to perform the method including: determining, by a power sensor, a first power output of a PV array of the solar PV system at a first time; causing, by a relay, switching of a load of a plurality of loads; determining, by the power sensor, a second power output of the PV array at a second time which is later than the first time after the switching of the load; comparing the first power output and the second power output; and based on the second power output being greater than the first power output, maintaining the switched load in its switched connection, or based on the second power output not being greater than the first power output, causing, by the relay, undoing of the switching of the load.

The foregoing features and elements may be combined in various combinations without exclusivity, unless expressly indicated herein otherwise. These features and elements as well as the operation of the disclosed embodiments will become more apparent in light of the following description and accompanying drawings. The contents of this section are intended as a simplified introduction to the disclosure, and are not intended to limit the scope of any claim.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

FIGS. 5A and 5B are plots related to power delivered and number of connected loads for a working example of simulated renewable energy systems in accordance with various exemplary embodiments;

FIG. 6 is a plot related to daily energy yield and delay time between two power measurements for a working example of simulated renewable energy systems in accordance with various exemplary embodiments;

FIG. 9 is a plot related to daily energy yield and delay time for a working example of simulated renewable energy systems in accordance with various exemplary embodiments;

FIGS. 10A and 10B are plots related to power delivered and number of connected loads of a working example of the same simulated renewable energy systems in accordance with various exemplary embodiments;

FIGS. 17A and 17B are plots related to power delivered and number of connected loads for a working example of simulated renewable energy systems in accordance with various exemplary embodiments;

FIGS. 18A and 18B are plots related to power delivered and number of connected loads for a working example of simulated renewable energy systems in accordance with various exemplary embodiments;

FIGS. 19A and 19B are plots related to measured power delivered to a working example of renewable energy systems in accordance with various exemplary embodiments; and FIGS. 20A and 20B are plots related to measured power delivered to a working example of renewable energy systems in accordance with various exemplary embodiments.

DETAILED DESCRIPTION

Figure 1:
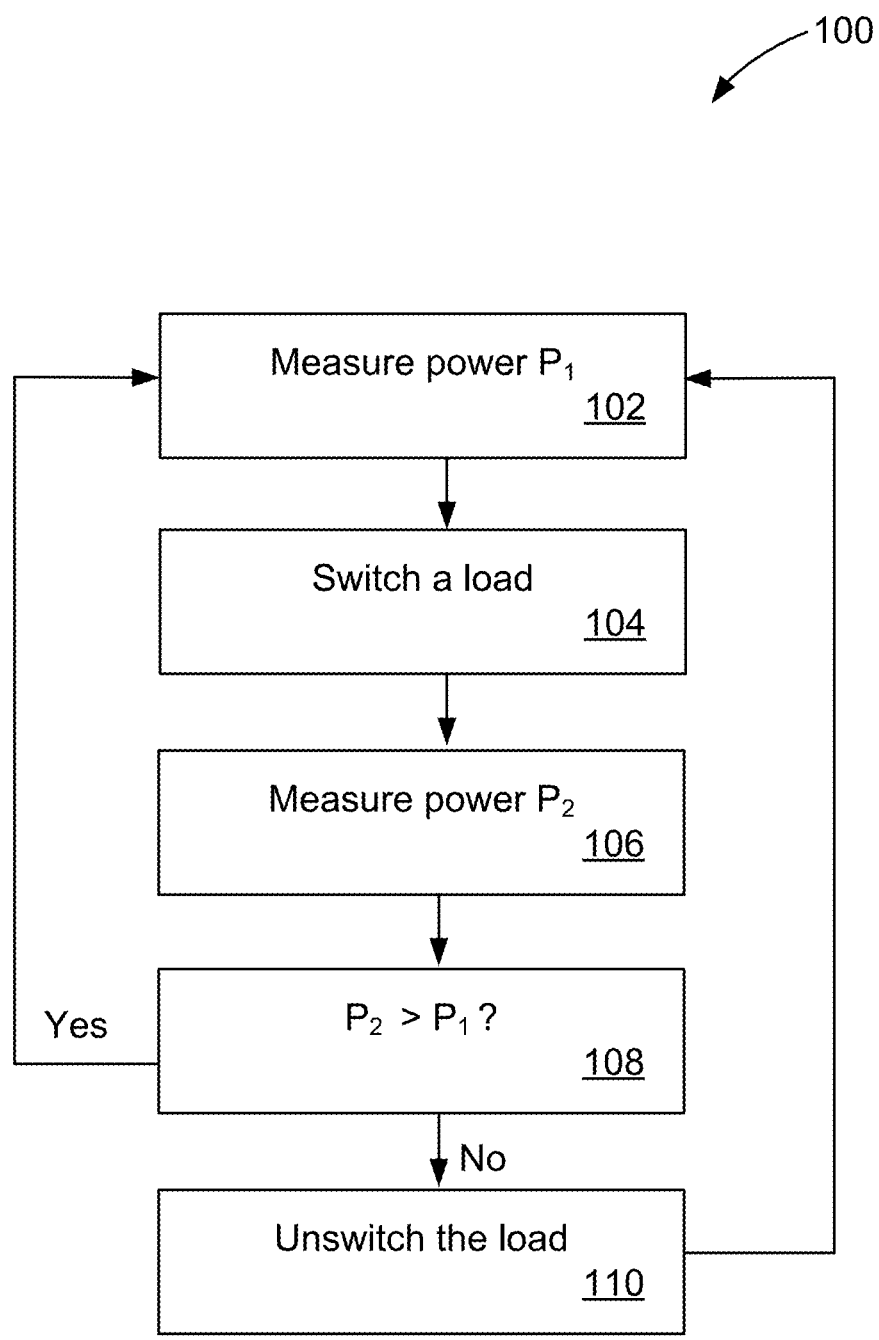
FIG. 1 is a process performed by a controller within renewable energy systems in accordance with various exemplary embodiments.

The detailed description of exemplary embodiments herein makes reference to the accompanying drawings, which show exemplary embodiments by way of illustration. While these exemplary embodiments are described in sufficient detail to enable those skilled in the art to practice the principles of the present disclosure, it should be understood that other embodiments may be realized and that logical changes and adaptations in design and construction may be made in accordance with principles of the present disclosure. Thus, the detailed description herein is presented for purposes of illustration only and not of limitation. For example, steps recited in any of the method or process descriptions may be executed in any suitable order and are not necessarily limited to the order presented. Furthermore, any reference to singular includes plural embodiments, and any reference to more than one component or step may include a singular embodiment or step. Moreover, while the embodiments presented herein are described in a context of a solar photovoltaic system, it would be apparent to one of ordinary skill in the art that various features described herein may also be applied to other types of renewable energy systems including, e.g., systems that utilize wind power, wave power, and/or the like without departing from the spirit and scope of the disclosure.

For the sake of brevity, conventional techniques for photovoltaic panel construction and use, as well as conventional approaches for electricity generation, storage, use, and/or the like may not be described in detail herein. Furthermore, the connecting lines shown in various figures contained herein are intended to represent exemplary functional relationships and/or physical couplings between various elements. It should be noted that many alternative or additional functional relationships or physical connections may be present in a practical load-matching controller for photovoltaic systems and/or method for utilizing intermittent electricity, for example electricity generated by a photovoltaic system.

Principles of the present disclosure may be compatible with, complementary to, and/or improve upon or supersede concepts contained in U.S. Pat. No. 10,399,441 entitled "Digital Load Management for Variable Output Energy Systems," the contents of which are hereby incorporated by reference (but excepting any subject matter disclaimers or disavowals, and except to the extent that the incorporated material is inconsistent with the express disclosure herein, in which case the language in this disclosure shall control).

Prior approaches described a topology for solar photovoltaic systems in which there are multiple loads available and the number of loads connected to the photovoltaic array is digitally managed in dynamic response to the intermittent photovoltaic power. For example, the system described in such prior approaches utilized a photodetector to measure the instantaneous maximum available photovoltaic power. Such a system may make decisions to connect or disconnect a next load from the photovoltaic array based on the information from the photodetector. In contrast, principles of the present disclosure contemplate eliminating the photodetector. The new system performs maximum power point tracking (MPPT) by comparing the power delivered to the loads before and after a load is connected or disconnected from the photovoltaic array. By eliminating the photodetector and issues related to it, principles of the present disclosure make the new system practical for commercial deployment.

The prevailing wisdom for solar photovoltaic systems is that the intermittent power from the photovoltaic array must be managed or conditioned to extract the maximum available photovoltaic power from the array and deliver it to the load. A maximum power point tracker is designed for this purpose, which is often incorporated into the power converter for the system such as the direct-current to alternating-current (DC/AC) inverter or the direct-current to direct-current (DC/DC) converter.

U.S. Pat. No. 10,399,441 describes a photovoltaic system topology in which there are multiple loads. These loads are actively managed, while traditional solar photovoltaic systems manage the power from the photovoltaic array. That is, the new system matches the power demand of the loads with the maximum available photovoltaic power by changing the number of loads connected to the photovoltaic array. The advantages of the new load-matching system include the following. (1) The new system is more efficient than traditional systems with a power converter. The load-matching system delivers nearly 100% of the maximum available photovoltaic energy to the loads, while traditional systems with a power converter have a system energy yield around 80%. (2) The new system has a lower cost as the power converter-based maximum power point tracker in traditional systems is eliminated. The load-matching system utilizes a microprocessor and a number of relays. (3) The new system has an excellent scalability from a few kilowatts peak to a few gigawatts peak. Scaling is accomplished by adding more loads to the system and there is no physical limitation on how many loads the system can have.

In the prior approaches, a load-matching system utilized a photodetector to monitor the instantaneous maximum available photovoltaic power. Such a system makes decisions to connect or disconnect the next load based on the information from the photodetector. Several practical challenges for this control strategy have been identified which are related to the difference in operating conditions between the photodetector and the photovoltaic array. For example, when the temperature of the photodetector is different from that of the photovoltaic array, it may cause loads to be connected or disconnected at sub-optimal moments. Small variations in position, orientation, and shading of the photodetector from day to day may affect the accuracy of the moments when loads are supposed to be connected or disconnected. These variations result from, e.g., wind, rain, snow, dust, falling leaves, bird droppings, etc. For example, a perfectly-optimized load-matching system may output 10% less energy the next day because of a small change in the photodetector.

Accordingly, disclosed herein are systems and methods whereby an improved control strategy may be implemented, eliminating a photodetector from a load-matching system.

In an improved load-matching system disclosed herein, the photodetector is eliminated, and a power sensor is added to monitor the power delivered to the loads. The improved system makes decisions based on the measured load power. FIG. 1 is a basic control algorithm for MPPT in the load-matching PV system described herein, which shows the improved control strategy based on a power sensor. Here a "switch" means an action of connecting a load or disconnecting a load. In an embodiment, the PV system measures the power delivered to all the connected loads, P1 (step 102). Then, the system makes a switch to connect or disconnect a load (step 104) and measures the power delivered to the new set of connected loads, P2 (step 106). If P2 is not greater than P1 (based on comparison in step 108), the system undoes the switch (step 110) and repeats step 102. If P2 is greater than P1 (based on comparison in step 108), the system maintains the switched load and repeats step 1. That is, the system compares the power output before and after a load is switched (connected or disconnected) to track the maximum power point.

Hardware Implementation

Figure 2A:
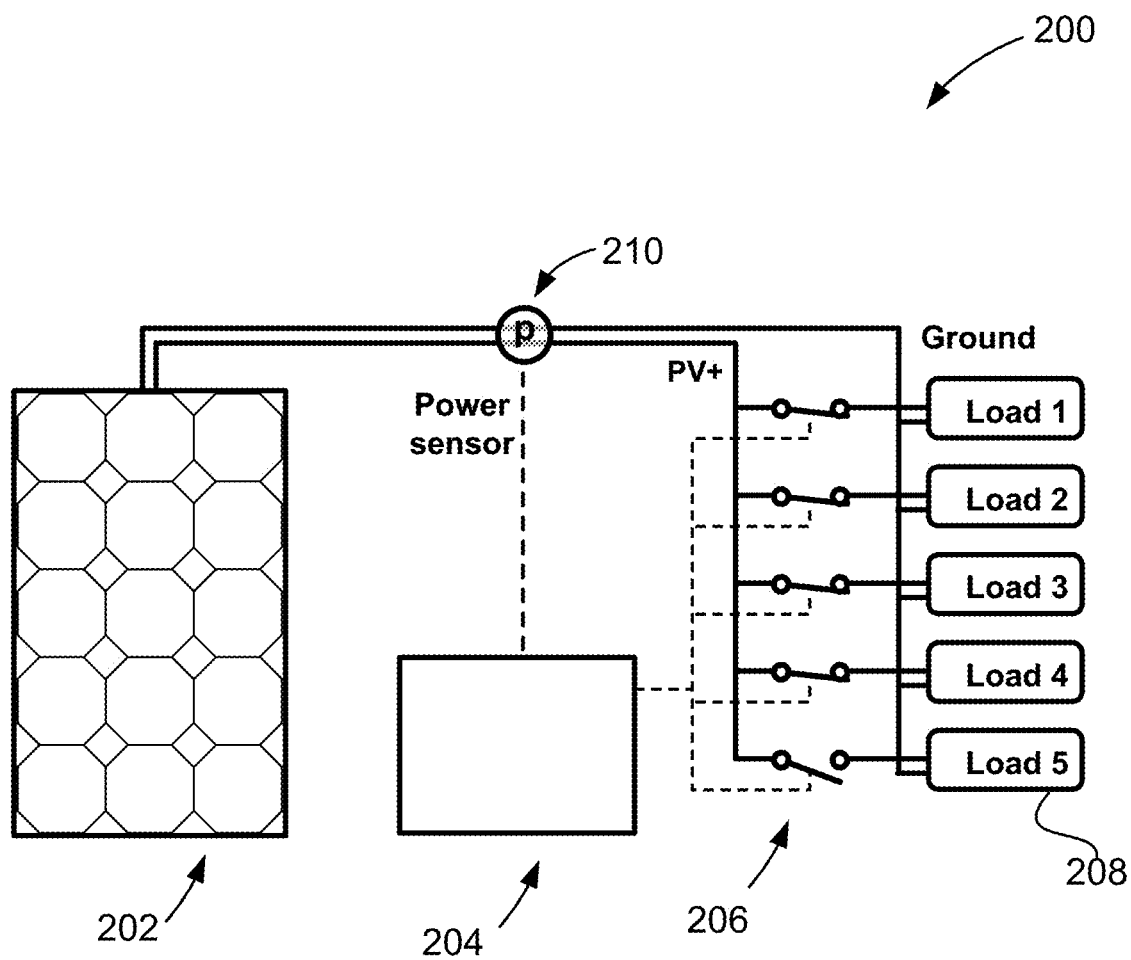
FIGS. 2A and 2B are diagrams illustrating components of renewable energy systems in accordance with various exemplary embodiments.
Figure 2B:
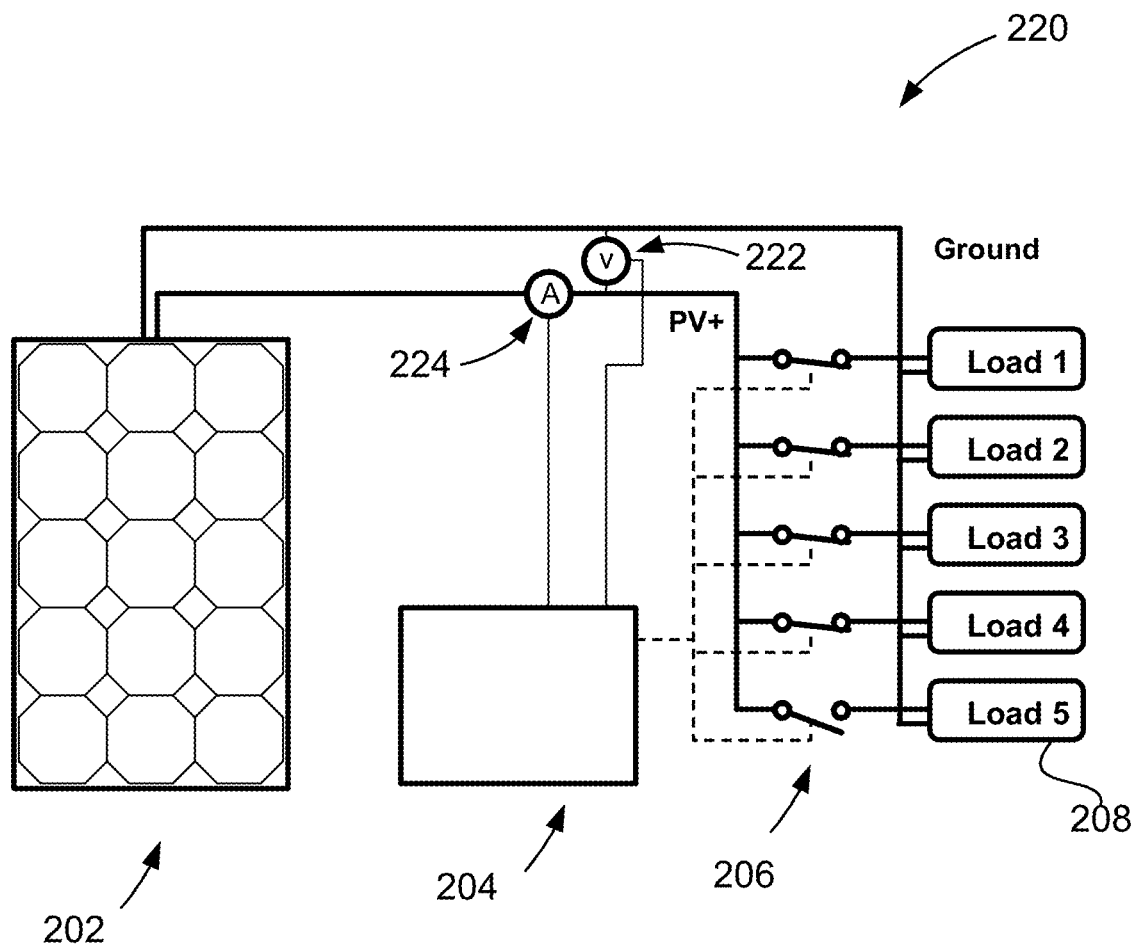

In various exemplary embodiments, the improved control strategy utilizes both hardware and a control algorithm. The hardware monitors the power delivered to the loads before and after a load is switched and then controls the relays based on that information. FIG. 2A shows a hardware implementation of the improved control strategy which is, e.g., feedback-based. The system 200 includes a PV array 202, a controller 204, a plurality of relays 206, a plurality of loads 208, and a power sensor 210. In one embodiment, the power sensor 210 may include a voltage sensor 222 and a current sensor 224 (see system 220 of FIG. 2B), but it does not require a photodetector. The voltage sensor 222 measures the voltage delivered to the connected loads 208.

Figure 3:
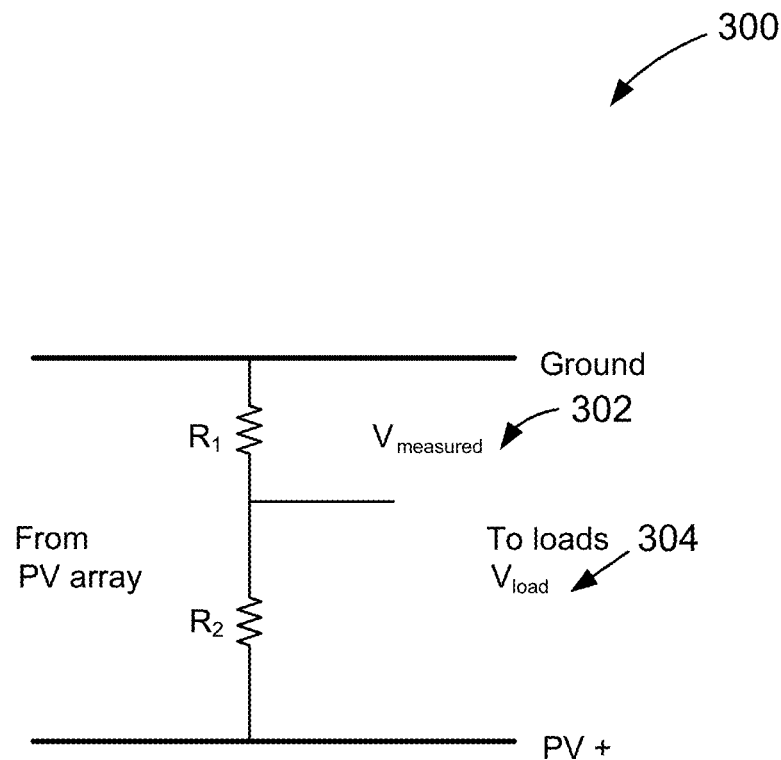
FIG. 3 is a diagram illustrating a voltage sensor within renewable energy systems in accordance with various exemplary embodiments.

A practical voltage sensor 222 may be a voltage divider 300 as shown in FIG. 3 (dividing as related to $V_{measured}$ 302 and $V_{load}$ 304). In an example, if the maximum voltage of the photovoltaic array 202 is 210 V, and the controller 204 takes a voltage signal between 0 V and 10 V, the values of the two resistors may be R1=5 kiloohms and R2=100 kiloohms. The voltage signal may be taken from the 5-kiloohm resistor. In this case, the voltage delivered to the loads, $V_{load}$ 304, and the voltage measured, $V_{measured}$ 302, have the relationship: $V_{load}=(V_{measured}\times(R1+R2))/R1$. This voltage sensor 222 may work for photovoltaic arrays of any voltage by choosing proper values for the two resistors.

In an example, the current sensor 224 may be a Hall effect sensor. The Hall sensor works for most photovoltaic arrays as the current range for Hall effect sensors is between a few amperes and tens of thousands of amperes. For a photovoltaic array with an even higher current, multiple Hall effect sensors can be used in the system 220. In the extreme case, a Hall effect sensor can be added to each load to measure the current on each load.

The voltage and current signals from the voltage sensor 222 and the current sensor 224 (or a power signal from the power sensor 210 in FIG. 2A) may be fed to the controller 204 to compute the power delivered to the loads 208. The controller 204 makes decisions to connect or disconnect the next load based the measured power. In case of multiple Hall effect sensors in the system, the controller 204 first may add all the currents or powers to compute the total power delivered to the loads 208 and then make decisions based on the total power.

Control Algorithm

In some embodiments, the photovoltaic (PV) systems described herein eliminates shortcomings related to, e.g., faulty switches the solar photovoltaic system may carry out, and minimizes additional shortcomings related to, e.g. premature switches by the system. Such unsuccessful switches result from the rudimentary control algorithm in FIG. 1 and may reduce the energy output of the system. Faulty switches may be due to noises in the solar irradiance profile. Premature switches may occur because the system does not have information relating to the optimum switch moment, thus utilizing a trial and error approach until it finds an optimum switch moment. Specifically, premature switches may happen when a system switches a load and finds that the power does not increase. Faulty switches may happen when the PV power increases but the system tries disconnecting a load. Faulty switches may happen due to noises in the solar irradiance profile over time.

As discussed herein, in order to eliminate faulty switches and minimize premature switches, the PV systems described herein may utilize several methods which can be incorporated into the basic control algorithm in FIG. 1 for this purpose.

The present disclosure demonstrates three methods used to eliminate or minimize these shortcomings resulting from the rudimentary control algorithm described in FIG. 1. Firstly, some embodiments of a photovoltaic system described herein may add a time delay between two consecutive power measurements, for example as described in FIG. 4 between P1 and P2. For example, in various embodiments under most weather conditions, a 10-second delay may be optimal. In some embodiments, under really sunny conditions such as, e.g., in Phoenix, Ariz., a 30-second delay may be acceptable. Secondly, some embodiments of the photovoltaic system described herein may average multiple power measurements for one data point. For example, if the measurement time is fixed as 1 second, the measurement frequency may be changed. In various embodiments, an optimum sampling frequency (e.g., an optimum number of measurements per a prescribed period of time) may be about 300 Hz (i.e., 300 measurements per second). Thirdly, in some embodiments, after a successful switch, the photovoltaic system as described herein may wait for a threshold power change before attempting another switch. An optimum threshold power may depend on a number of loads the system has. For example, for a six-load system, an optimum power threshold may be about 2%.

Figure 4:
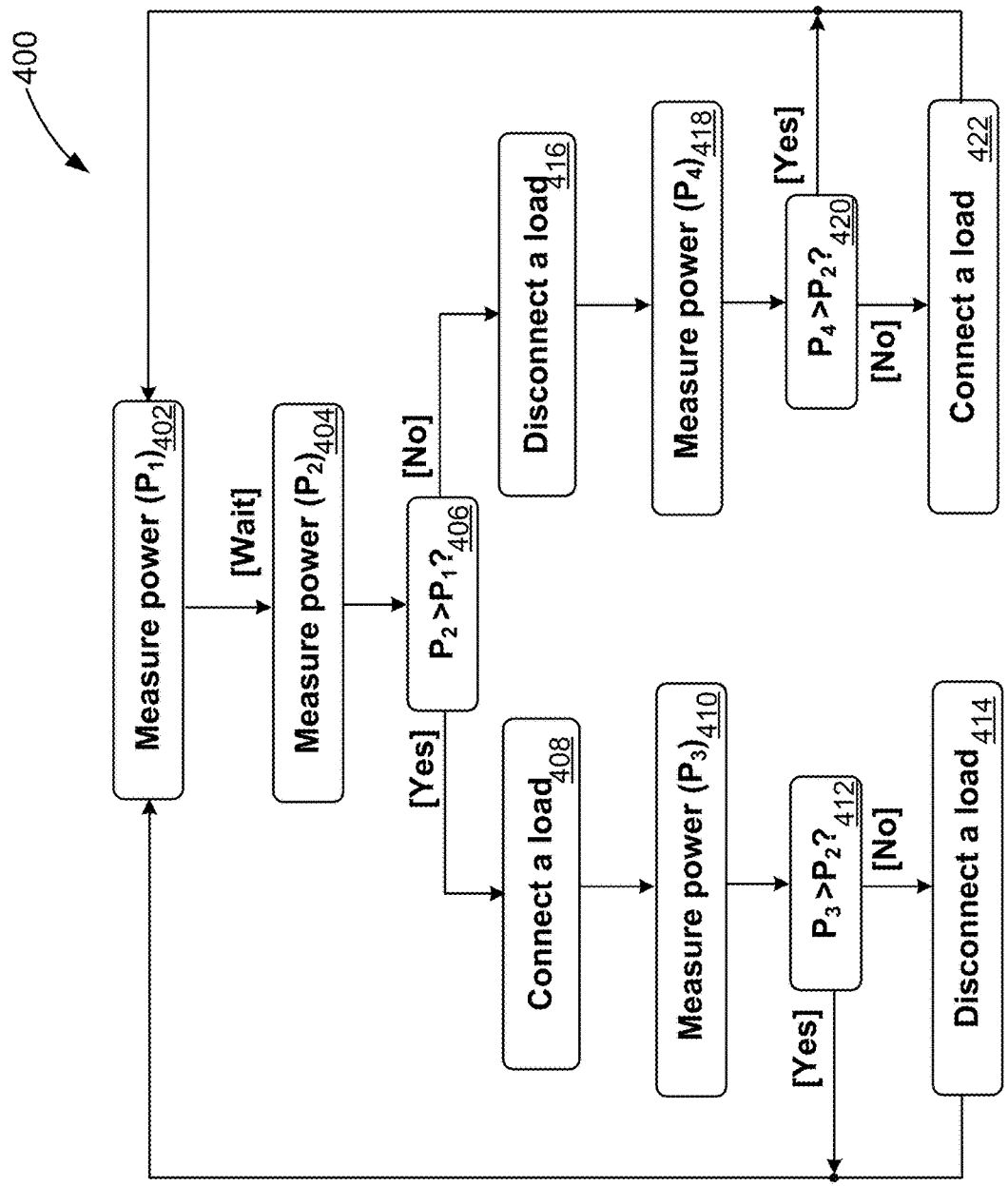
FIG. 4 is a process performed by a controller within renewable energy systems in accordance with various exemplary embodiments.

In various embodiments, one method to eliminate faulty switches and minimize premature switches is to monitor the change in delivered power to the same number of connected loads over time. If the power increases over time, the only switch worth trying is to connect another load 208. If the power decreases over time, the only switch to try is to disconnect a load 208 from the photovoltaic array 202. By monitoring the power change over time, such a methodology may eliminate about half of the premature switches in one example. FIG. 4 shows the logic diagram for this improved control algorithm.

Another method to eliminate faulty switches and minimize premature switches is to wait for the change in delivered power over time to reach a threshold. Each load may utilize a certain amount of power to drive, and it may take some time for the available photovoltaic power to change by that amount.

Yet another method to eliminate faulty switches and minimize premature switches is to add a time delay between two subsequent power measurements. After a power measurement, it may take some time for the available photovoltaic power to change by an unambiguous amount to avoid a faulty switch.

Still another method to eliminate faulty switches and minimize premature switches is to average multiple power measurements for one data point. If the power measurement time is fixed to 1 second, the measurement frequency (sampling frequency; e.g., a number of measurements per second or the like) may be changed to vary the number of measurements to average. Such an averaged power point may minimize the noise in solar irradiance profile.

An Example Control Algorithm and Working Example

To build a functional algorithm and analyze the performance of the system 200 described herein, several methods to improve the rudimentary algorithm in FIG. 1 have been implemented in SIMULINK. The feedback-based load-matching PV system in SIMULINK consisted of six equal-resistance loads. To maximize system energy yield and minimize PV curtailment, the resistance of each load was selected to match the combined resistance of six parallel loads with the characteristic resistance of the selected PV module under standard test conditions (AM 1.5 and 25° C.). The selected module had a $V_{mp}$ of 31.74 V and an $I_{mp}$ of 9.134 A. Each load had a resistance of 20.85Ω.

Power over Time

The first improvement to the algorithm in FIG. 1 is to monitor the PV power over time. In FIG. 1, each switch represents two possibilities: connect or disconnect a load. Referring to FIG. 4, by measuring the power at two different times (steps 402 and 404), one of the two possibilities can be eliminated (see FIG. 4); if the second power measured, $P_2$, is greater than the first, $P_1$ (based on step 406), the system 200 will only try to connect another load (step 408). Otherwise, the system 202 will try disconnecting a load (step 416). The system 200 will then compare the powers before and after a switch to track the higher power (steps 410-414 and 418-422). The system 200 will continue switching loads 208 until the maximum power point is found. It will be appreciated that, in various exemplary embodiments, a time delay and threshold power are implemented between P1 and P2 shown in FIG. 4, prior to any switch.

To analyze the effectiveness of the algorithm in FIG. 4 in a variety of atmospheric conditions, it was implemented in SIMULINK with sunny and cloudy day solar irradiance profiles from PV_Lib toolbox developed by Sandia National Laboratories. The simulation was conducted with a constant 25° C. temperature and a 10-s delay time between the two power measurements $P_1$ and $P_2$. FIGS. 5A and 5B show the power delivered to the loads and the number of connected loads over the course of a sunny day. By switching loads throughout the day, the system closely tracked the maximum power point of the PV module, without any power converter.

As applicable to the working example described herein, methods to minimize premature switches and faulty switches and maximize the daily energy yield of the system are introduced herein, including a delay between two power measurements, averaged power measurements, and a power threshold before attempting a switch.

Delay Time

The delay time between measuring $P_1$ and $P_2$ was changed between 1 s and 1,000 s and its effect on system daily energy yield is shown in FIG. 6 for a sunny day. Increasing the delay time increases the energy yield. This is because premature switches are reduced due to longer delay times. The maximum energy yield is at a delay time of 350 s on a sunny day. However, the energy yield starts to decline as the delay time exceeds 400 s. This is due to the system waiting too long and missing the optimal switch points. The window of optimal delay time is between 200 s and 350 s on a sunny day.

Averaged Measurements

Figure 7:
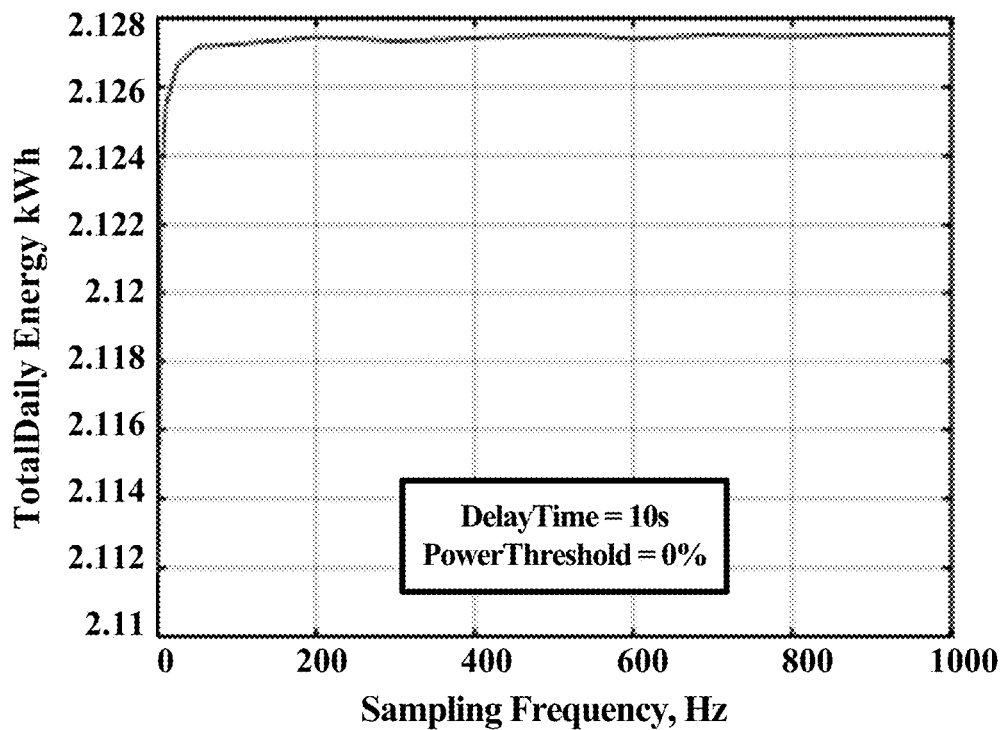
FIG. 7 is a plot related to daily energy yield and sampling frequency for a working example of simulated renewable energy systems in accordance with various exemplary embodiments.

As noises occur in any solar irradiance profile, taking multiple power measurements and averaging them provide a way to minimize the impact of noise. In a working example, the measurement time was fixed to 1 s and the delay time to 10 s. The sampling frequency was changed from 1 Hz to 1,000 Hz, and FIG. 7 shows the effect of sampling frequency on daily system energy yield for a sunny day. More measurements to average improve the energy yield since faulty switches are reduced. However, the effect of sampling frequency stabilizes above 100 Hz, and 350 Hz is optimal for a sunny day. Any further increase in sampling frequency results in insignificant energy gains but may utilize more computing power for the algorithm.

Power Threshold

The effect of a power threshold before attempting a switch was investigated. The targeted shortcoming was that before there is enough change in PV power, a switch may be unsuccessful. The control step in FIG. 4, "$P_2 > P_1$?", was replaced with:

$$\frac{|P_2 - P_1|}{P_1} > P_{threshold}? \tag{1}$$

Figure 8:
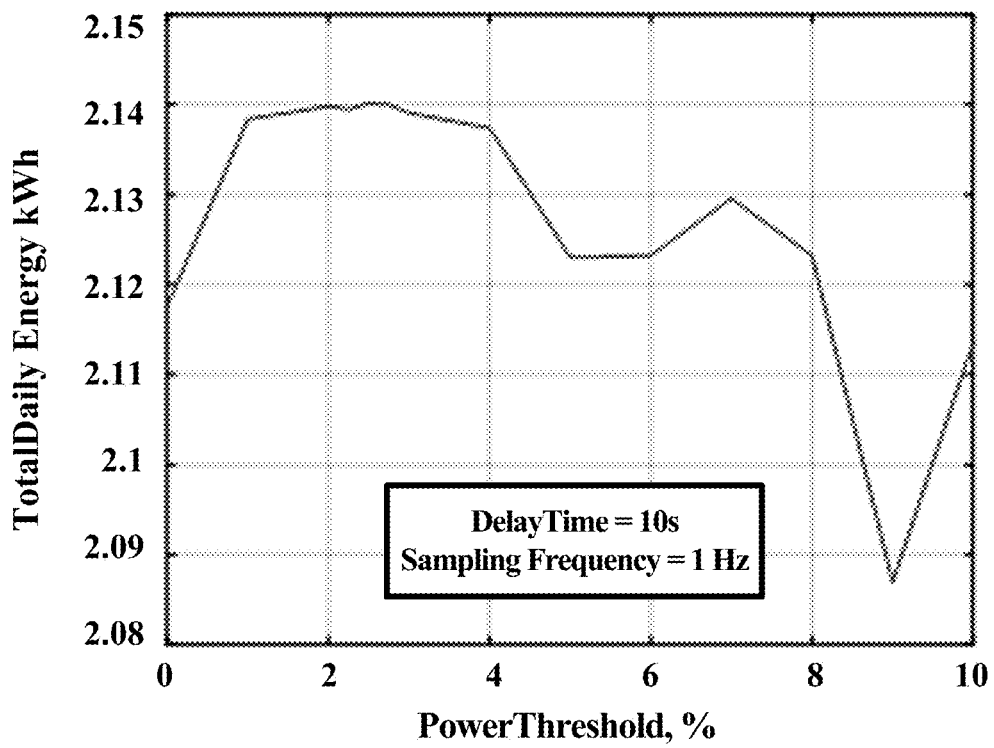
FIG. 8 is a plot related to daily energy yield and power threshold between two switches for a working example of simulated renewable energy systems in accordance with various exemplary embodiments.

In this analysis, the sampling frequency was fixed at 1 Hz, the delay time at 10 s, and the power threshold was varied from 0% to 10% of $P_1$. FIG. 8 shows the daily system energy yield as a function of power threshold expressed in percent of $P_1$. The energy yield improves with the power threshold to a certain extent. When the power threshold is too high, optimal switch points are missed and the energy yield suffers. A power threshold between 2% and 2.5% was found to be the most optimal for six loads on a sunny day.

Co-Optimization

To find the optimal combination of delay time, sampling frequency, and power threshold, the three parameters described herein were investigated collectively. Increasing the sampling frequency, as shown in FIG. 7, decreases the noise in the system and improves the energy yield of the system even when coupled with both delay time and power threshold. A sampling frequency of 350 Hz is still the most optimal setting and is used in the following.

Delay time and power threshold are both switching conditions, so they may be examined together to find the most optimal combination. As the power threshold increases, the need for a longer delay time decreases and vice versa. FIG. 9 shows the system energy yield during a sunny day when the power threshold is set at its optimal value, 2%, while the delay time is varied between 1 s to 60 s. A 2% power threshold with a 30 s delay time and sampling frequency of 350 Hz produced the highest energy yield on a sunny day.

Working Example for Cloudy Days

The discussion presented above focuses on system energy yield on a sunny day. The delay time, sampling frequency, and power threshold were also optimized for a cloudy day. FIGS. 10A and 10B show the power delivered and the number of connected loads to the PV module for the same load-matching system on a cloudy day with a constant 25° C. temperature. The delay time, sampling frequency, and power threshold are 10 s, 1 Hz, and 0%, respectively.

Figure 11:
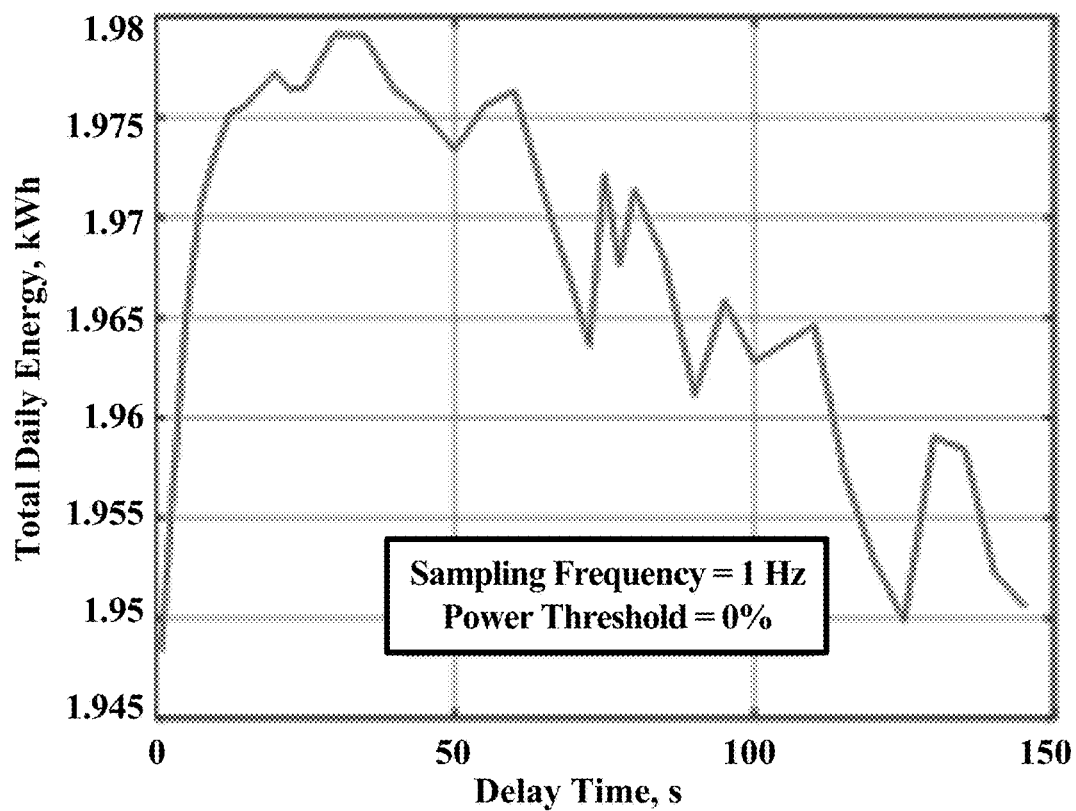
FIG. 11 is a plot related to daily energy yield and delay time between two power measurements for a working example of simulated renewable energy systems in accordance with various exemplary embodiments.
Figure 12:
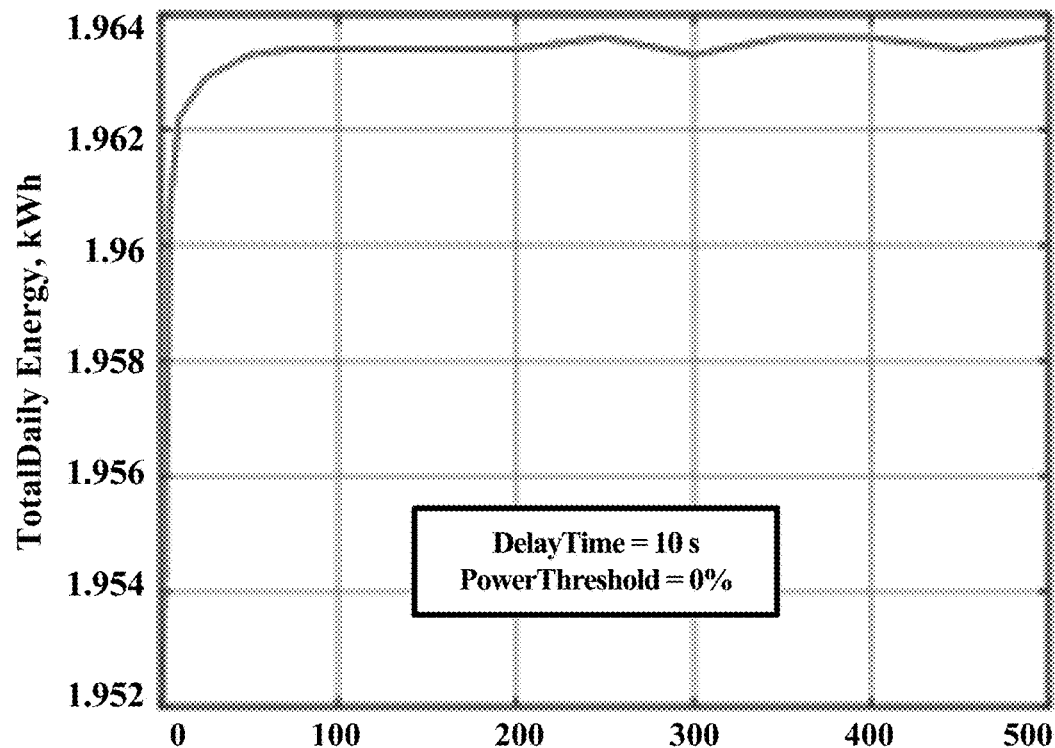
FIG. 12 is a plot related to daily energy yield and sampling frequency for a working example of simulated renewable energy systems in accordance with various exemplary embodiments.

FIG. 11 shows the effect of delay time on daily energy yield for a cloudy day. In comparison to the sunny day results (FIG. 6), the energy yield suffers more during cloudy days when the delay time is not optimized. In general, the system works with a shorter delay time to match the rapid changes in solar irradiance between switches on a cloudy day. The optimal delay time may be now 30 s instead of 350 s for a sunny day. On the other hand, the effect of sampling frequency shown in FIG. 12 is similar between sunny and cloudy days, and a sampling frequency between 250-400 Hz is optimal which is similar to FIG. 7.

Figure 13:
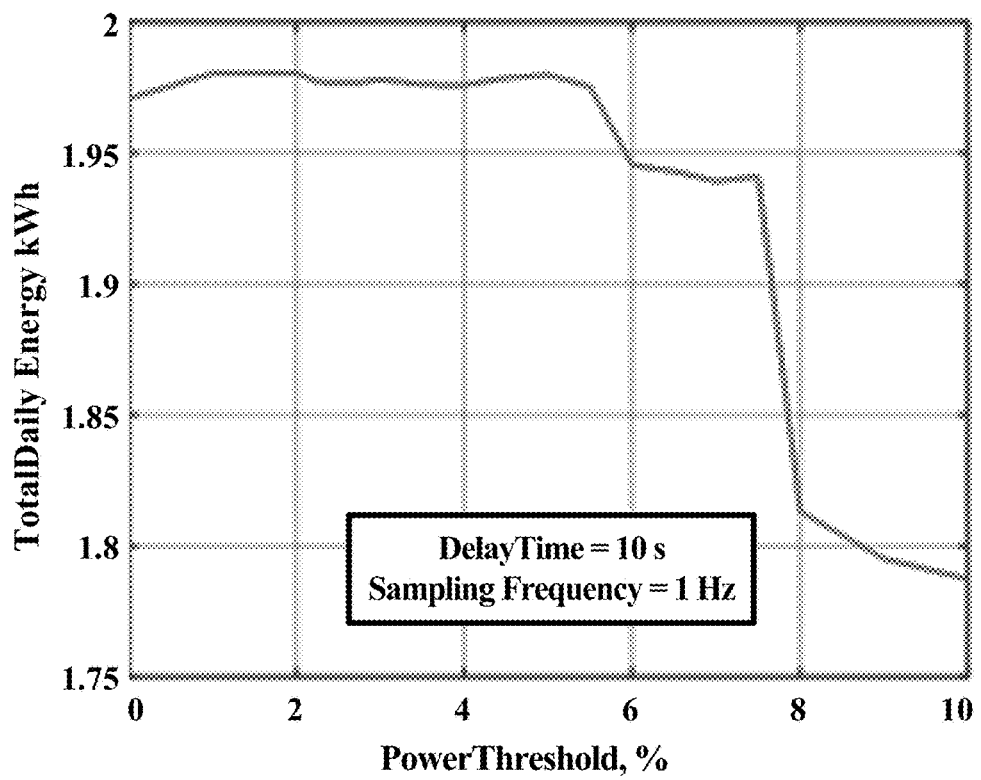
FIG. 13 is a plot related to daily energy yield and power threshold for a working example of simulated renewable energy systems in accordance with various exemplary embodiments.

FIG. 13 shows the daily system energy yield as a function of power threshold on a cloudy day, with a delay time of 10 s and sampling frequency of 1 Hz. Similar to FIG. 8 for a sunny day, the energy yield improves with power threshold to a certain extent. The maximum energy yield is at a power threshold of 2% for the cloudy day, which is similar to the optimal value for a sunny day, between 2% and 2.5%.

Figure 14:
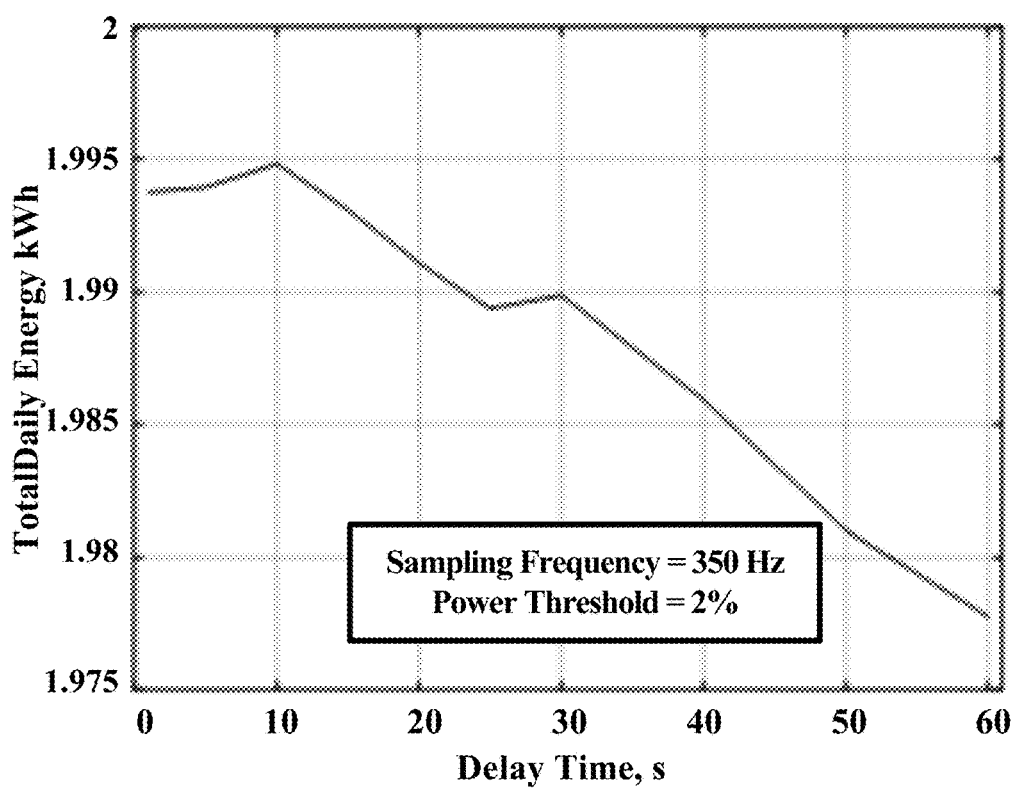
FIG. 14 is a plot related to daily energy yield and delay time for a working example of simulated renewable energy systems in accordance with various exemplary embodiments.

FIG. 14 shows the co-optimization of delay time and power threshold when the sampling frequency was fixed to its optimal value, 350 Hz. Like the sunny day results in FIG. 9, the addition of a power threshold reduces the need for a longer delay time. For cloudy days, the most optimal parameters are 2% power threshold, 10 s delay time, and 350 Hz sampling frequency.

Working Example for Combined Sunny and Cloudy Days

Figure 15:
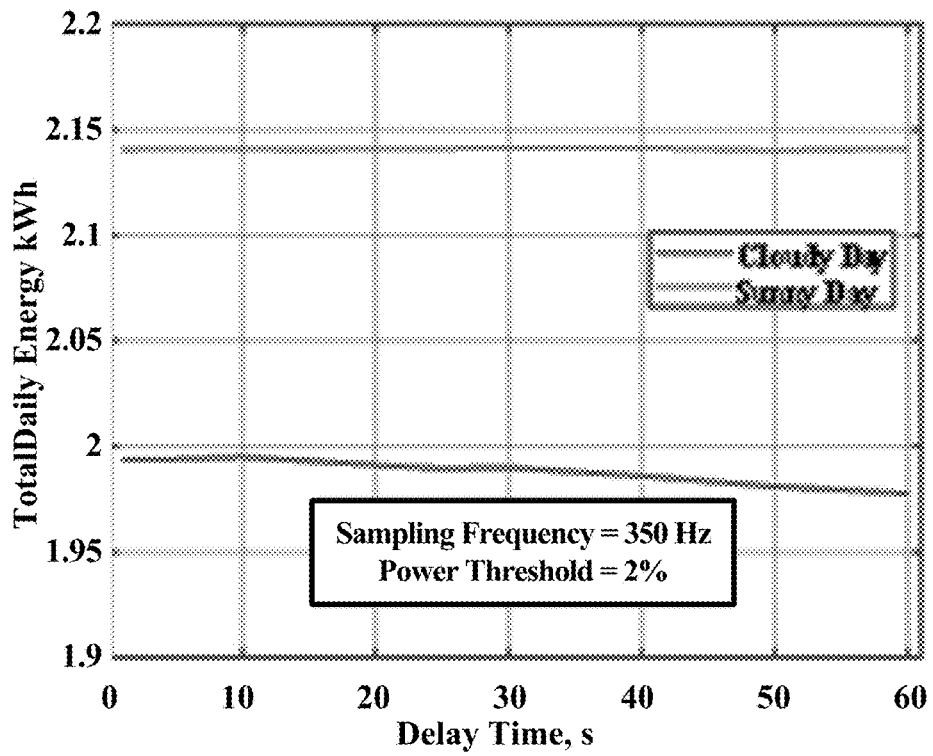
FIG. 15 is a plot related to daily energy yield and delay time for a working example of simulated renewable energy systems in accordance with various exemplary embodiments.

The optimal values for delay time, sampling frequency, and power threshold for entirely sunny or cloudy days were identified above. The system energy yield under a combination of sunny and cloudy days may also be considered. The optimal sampling frequency and power threshold were found to be the same in sunny and cloudy days, 350 Hz and 2%, so the delay time was varied, and the system energy yield were examined. As shown in FIG. 15, a longer delay time results in more energy loss on cloudy days than on sunny days.

Figure 16:
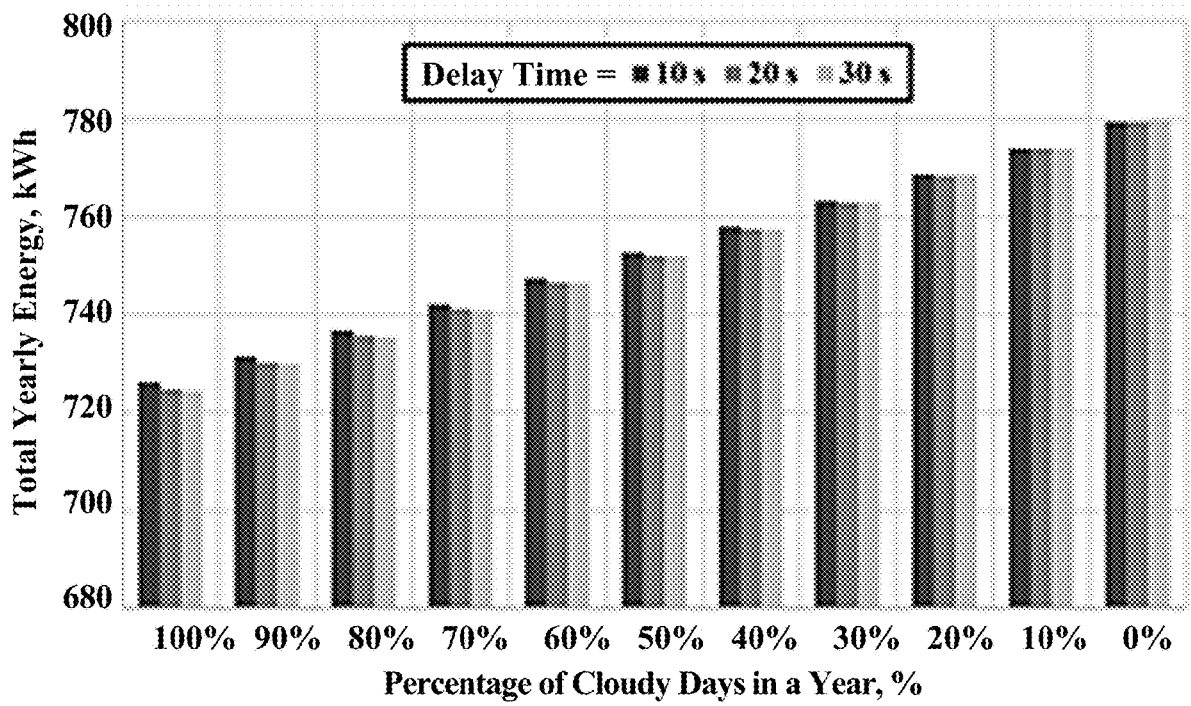
FIG. 16 is a plot illustrating an effect of delay time on yearly energy yield for a working example of simulated renewable energy systems in accordance with various exemplary embodiments.

FIG. 16 shows the yearly system energy yield for a delay time between 10 s and 30 s for different numbers of cloudy days in a year. It was found that a delay time of 10 s, the optimal delay time for cloudy days, maximizes the yearly energy yield for locations with 30 or more cloudy days in a year, but the difference was small. In locations with less than 30 cloudy days a year, a 30 s delay time was slightly better. These results illustrate the effect of weather conditions for different regions (e.g., related to how many sunny days a year a region has), and suggest that the load-matching system should focus more on cloudy days to maximize its yearly energy yield.

The power delivered to the loads and the number of connected loads using an algorithm with optimized parameters are presented in FIGS. 17A-B and FIGS. 18A-B for sunny and cloudy days. Premature switches are significantly reduced, and faulty switches are eliminated as compared to FIG. 5 and FIG. 10. In addition, although the optimal parameters are closer to cloudy day values, they work well for sunny days too. Therefore, the improved algorithm was able to drastically reduce unsuccessful switches while accurately tracking the maximum power point.

Experimental Verification of Working Example

The results from the simulation (discussed above with reference to various FIGs) are supported by experimental results conducted in Tempe, Ariz. The load-matching PV system used includes a silicon module of 140 $W_p$ with a characteristic resistance of approximately 3Ω under AM1.5 solar irradiance, a power sensor, an Allen-Bradley Pico 1760-L18BWB-EX programmable logic controller with six built-in relays, and six 50-W resistive loads set at 18Ω each so the combined resistance of the six parallel loads matches the characteristic resistance of PV module, 3Ω. In this experiment, the sampling frequency, delay time, and power threshold were set to 100 Hz, 10 s, and 2%, respectively. The old computer in the load-matching system limits the sampling frequency to 100 Hz, but the optimal value is 350 Hz. As stated above (for FIGS. 7 and 12), the improvement in energy yield from increasing the sampling frequency stabilizes after 100 Hz so the energy loss is less significant.

FIGS. 19A-B show the power delivered to the loads on a sunny day using the improved algorithm (experimental results). The curves in FIGS. 19A-B take the general shapes of the curves in FIGS. 17A-B. As the solar irradiance increased in the morning, the loads were connected to the PV module one by one. As the irradiance decreased past noon, the algorithm successfully disconnected loads from the PV module following the maximum power point. FIGS. 20A-B show the experimental results of the system on a cloudy day. While the solar irradiance varied widely throughout the day, the feedback-based algorithm was able to respond in real time. It was also able to eliminate faulty switches and minimize premature switches for a better system energy yield as predicted by the simulation.

The power curves in FIGS. 19A-B suggests that the combined resistance of the six parallel resistors does not match perfectly with the characteristic resistance of the PV module around noon. When perfectly matched, the power curve should resemble a cosine function with a sharper peak as shown in FIGS. 17A-B. Therefore, matching the combined resistance of the loads with the characteristic resistance of the PV array under the highest local solar irradiance is essential to designing an efficient load-matching system and minimizing PV curtailment. It is ideal to have the historical solar irradiance data for the location for system design.

The control algorithm for a feedback-based load-matching PV system is discussed herein. It tracks the maximum power point without the need for a photodetector or a traditional maximum power point tracker. Several methods to improve the control algorithm have been investigated in both SIMULINK and experiment for a system with six equal-resistance loads, including monitoring PV power over time, a time delay between two power measurements, averaging multiple power measurements, and a power threshold before attempting a switch. A time delay between 10 s and 30 s may be utilized for cloudy and sunny days, respectively, the optimal sampling frequency is approximately 350 Hz, and the optimal power threshold 2% for six loads. The actual delay time for a system can be modified based on the number of cloudy days out of a year for a specific location.

Improved load-matching systems and methods as disclosed herein have application in industrial electrolysis, solar energy storage, electric vehicle charging, water treatment, and the like.

While the principles of this disclosure have been shown in various exemplary embodiments, many modifications of structure, arrangements, proportions, the elements, materials and components, used in practice, which are particularly adapted for a specific environment and operating requirements may be used without departing from the principles and scope of this disclosure. These and other changes or modifications are intended to be included within the scope of the present disclosure and may be expressed in the following claims.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of any embodiment. In the claims, reference to an element in the singular is not intended to mean "one and only one" unless explicitly so stated, but rather "one or more."

Moreover, when language similar to "at least one of A, B, or C" or "at least one of A, B, and C" is used in the claims, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C. The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

Systems, methods and apparatus are provided herein. In the detailed description herein, references to "various exemplary embodiments", "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. The word "exemplary" is used herein to mean "serving as an example, instance or illustration". Any embodiment described as "exemplary" is not necessarily to be construed as preferred or advantageous over other embodiments and/or to exclude the incorporation of features from other embodiments. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In re Nuijten to fall outside the scope of patentable subject matter under 35 U.S.C. § 101.

What is claimed is:

1. A load management system for a solar photovoltaic (PV) system, the system comprising:
    a PV array of solar modules;
    a plurality of loads configured to be powered by the PV array and switched on or off by a plurality of respective relays;
    a power sensor configured to measure an amount of power delivered from the PV array to the plurality of loads; and
    a controller coupled to the power sensor and the plurality of relays and configured to:
        determine, by the power sensor, a first power output of the PV array at a first time;
        cause, via a relay, a switch of a load;
        determine, by the power sensor, a second power output of the PV array at a second time which is later than the first time after the switching of the load;
        compare the first power output and the second power output; and
        based on the comparison:
            if the second power output is greater than the first power output, maintain the switched load in its switched connection; and
            if the second power output is not greater than the first power output, cause, by the relay, undoing of the switch of the load;
        wherein a power output of the PV array is not configured to be routed through the controller for conditioning or managing prior to being delivered to any of the plurality of loads, and
        wherein the solar PV system does not comprise power conditioning electronics for the power output of the PV array.

2. The load management system of claim 1, wherein the controller is further configured to determine another power output between the determination of the first power output and the switch of the load.

3. The load management system of claim 2, wherein a delay between the determination of the first output and the determination of the another power output is at least one of a 10-second delay or a 30-second delay.

4. The load management system of claim 1, wherein the determination of the first power output, the determination of the another power output, and the determination of the second power output each comprise averaging of a plurality of power output measurements from a plurality of respective times,
  wherein the first power output comprises a first average of a first plurality of power output measurements, and
  wherein the second power output comprises a second average of a second plurality of power output measurements.

5. The load management system of claim 4, wherein the plurality of power output measurements are obtained based on a sampling frequency comprising a number of measurements per a prescribed period of time.

6. The load management system of claim 5, wherein the sampling frequency is approximately 300 measurements per second.

7. The load management system of claim 2, wherein the controller is further configured to:
  determine a difference between the first power output and the another power output; and
  based on the difference between the first power output and the another power output not satisfying a threshold amount of change, disabling coupling or decoupling of a load.

8. The load management system of claim 7, wherein if a number of the plurality of loads is six, the threshold amount of change is two percent.

9. The load management system of claim 1, wherein the power sensor comprises a voltage sensor and a current sensor.

10. A method for managing a solar photovoltaic (PV) system, the method comprising:
  determining, by a power sensor, a first power output of a PV array of the solar PV system at a first time;
  causing, by a relay, switching of a load of a plurality of loads;
  determining, by the power sensor, a second power output of the PV array at a second time which is later than the first time after the switching of the load;
  comparing the first power output and the second power output; and
  based on the second power output being greater than the first power output, maintaining the switched load in its switched connection, or based on the second power output not being greater than the first power output, causing, by the relay, undoing of the switching of the load.

11. The method of claim 10, further comprising determining another power output between the determining of the first power output and the switching of the load.

12. The method of claim 11, wherein a delay between the determining of the first output and the determining of the another power output are at least one of a 10 second delay or a 30-second delay.

13. The method of claim 10, wherein the plurality of loads have a fixed resistance value.

14. The method of claim 10, wherein the plurality of loads have an identical resistance value.

15. The method of claim 10, wherein at least one of the plurality of loads has a variable resistance value.

16. The method of claim 15, wherein at least one of the plurality of loads comprises at least one of a battery, an electrolyzer, an electric vehicle, a furnace, a lighting system, a water chiller, or an HVAC system.

17. The method of claim 10, wherein the plurality of loads are each configured to be independently coupled to and uncoupled from a PV array of the solar PV system responsive to a signal.

18. The method of claim 10, wherein the solar PV system does not comprise a photodetector.

19. The method of claim 10, wherein a controller of the solar PV system does not utilize information from a photodetector to determine any power output of a PV array of the solar PV system.

20. A controller apparatus for managing a solar photovoltaic (PV) system, the controller apparatus comprising:
  a processor configured to perform the method of claim 10.

* * * * *